United States Patent
Tsuzuki (10) Patent No.: US 7,839,578 B2
(45) Date of Patent: Nov. 23, 2010

(54) OPTICAL APPARATUS

(75) Inventor: Masahiko Tsuzuki, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/504,520

(22) Filed: Jul. 16, 2009

(65) Prior Publication Data

US 2010/0033837 A1 Feb. 11, 2010

(30) Foreign Application Priority Data

Aug. 7, 2008 (JP) ............................. 2008-204514

(51) Int. Cl.
*G02B 15/14* (2006.01)
(52) U.S. Cl. ..................................... 359/694; 359/683
(58) Field of Classification Search ......... 359/694–701, 359/819–824, 676–692, 554, 557
See application file for complete search history.

(56) References Cited

U.S. PATENT DOCUMENTS

| 6,147,814 A * | 11/2000 | Kitazawa et al. ............ 359/699 |
| 7,187,504 B2 * | 3/2007 | Horiuchi ..................... 359/683 |
| 7,336,426 B2 * | 2/2008 | Nakatani et al. ............. 359/683 |

FOREIGN PATENT DOCUMENTS

| JP | 64-084233 A | 3/1989 |
| JP | 04-024606 A | 1/1992 |

* cited by examiner

*Primary Examiner*—Mohammed Hasan
(74) *Attorney, Agent, or Firm*—Canon U.S.A., Inc. I.P. Division (57) ABSTRACT

An optical apparatus includes an optical system in which two zoom lens units perform zooming in different ranges in accordance with a zoom position, and a mechanism for driving the two zoom lens units by a single driving portion. An urging force for urging moving members toward an interlocking movement member that is moved along the optical axis by a feed screw is cut off by regulating portions.

4 Claims, 9 Drawing Sheets

OPTICAL APPARATUS

BACKGROUND OF THE INVENTION

1. Field of the Invention

The present invention relates to optical apparatuses capable of zooming. More particularly, the present invention relates to an optical apparatus for image taking and an optical apparatus for observation, for example, a digital still camera, a video camera, or an interchangeable lens.

2. Description of the Related Art

A typical lens apparatus including a plurality of moving lens units adopts a mechanical interlocking mechanism using a cam ring, and a driving portion (actuator) for each of the moving lens units.

Computer zooming is known in which each driving portion (actuator) performs zooming and focusing.

To reduce the cost by sharing the driving portion, there has been proposed a mechanism in a lens apparatus for driving two moving lens units by one actuator.

For example, in a mechanism disclosed in Japanese Patent Laid-Open No. 64-84233, a zoom lens unit and a focus lens unit are driven by a single driving portion while switching an interlocking movement mechanism, such as a plunger, so as to perform zooming and focusing in order.

Japanese Laid-Open No. 04-24606 discloses a mechanism in which a bifocal zoom lens unit and a focus lens unit are driven by a single driving portion so as to perform switching between two focal points and focusing in order.

A lens apparatus provided with an optical system in which zooming is performed by two zoom lens units in different areas in accordance with the zoom position will be considered.

In this case, to drive the two zoom lens units by mechanical interlocking using a cam ring, it is necessary to adopt a cam driving mechanism that uses a gear reduction device or the lie and that generates high torque to drive the cam ring.

Because of this complicated cam driving mechanism, operating noise, such as tapping noise of gears that constitute the cam driving mechanism, increases. Hence, the cam driving mechanism is not suitable for movie taking that also records sound.

However, even when the two zoom lens units are applied to the above-described two mechanisms that perform zooming and focusing in order, it is difficult to realize continuous zooming.

SUMMARY OF THE INVENTION

The present invention provides an optical apparatus including a mechanism that drives two zoom lens units by one driving unit by using an optical system in which the two zoom lens units perform zooming in different zoom ranges in accordance with a zoom position.

An optical apparatus according to an aspect of the present invention includes a first moving member configured to hold a first zoom lens unit; a second moving member configured to hold a second zoom lens unit; a feed screw provided parallel to the optical axis of the first zoom lens unit and the second zoom lens unit; an actuator configured to drive the feed screw; an interlocking movement member configured to move along the optical axis with rotation of the feed screw; a first urging member configured to urge the first moving member toward the interlocking movement member; a second urging member configured to urge the second moving member toward the interlocking movement member; a first regulating portion configured to regulate movement of the first moving member along the optical axis; and a second regulating portion configured to regulate movement of the second moving member along the optical axis. The first moving member and the second moving member are moved along the optical axis by movement of the interlocking movement member along the optical axis.

An optical apparatus according to another aspect of the present invention includes a first lens unit having a positive refractive power; a second lens unit having a negative refractive power and configured to move along an optical axis during zooming; a third lens unit having a positive refractive power; a fourth lens unit having a negative refractive power and configured to move along the optical axis during zooming; a fifth lens unit having a positive refractive power and configured to move along the optical axis during focusing; a first moving member configured to hold the second lens unit; a second moving member configured to hold the fourth lens unit; a feed screw provided parallel to the optical axis of the second lens unit and the fourth lens unit; an actuator configured to drive the feed screw; an interlocking movement member configured to move along the optical axis with rotation of the feed screw; a first urging member configured to urge the first moving member toward the interlocking movement member; a second urging member configured to urge the second moving member toward the interlocking movement member; a first regulating portion configured to regulate movement of the first moving member along the optical axis; and a second regulating portion configured to regulate movement of the second moving member along the optical axis. The first to fifth zoom lens units are arranged in order from an object side to an image side. The first moving member and the second moving member are moved along the optical axis by movement of the interlocking movement member along the optical axis.

Since an urging force for urging the moving members toward the interlocking movement member that is moved along the optical axis by the feed screw is cut off by the regulating portions in the present invention, it is possible to reduce the size and operating noise.

Further features of the present invention will become apparent from the following description of exemplary embodiments with reference to the attached drawings.

BRIEF DESCRIPTION OF THE DRAWINGS

FIG. 8 (8A and 8B) is a flowchart explaining zooming in the second embodiment.

DESCRIPTION OF THE EMBODIMENTS

Embodiments of the present invention will be described in detail below with reference to the attached drawings.

First Embodiment

Figure 1:
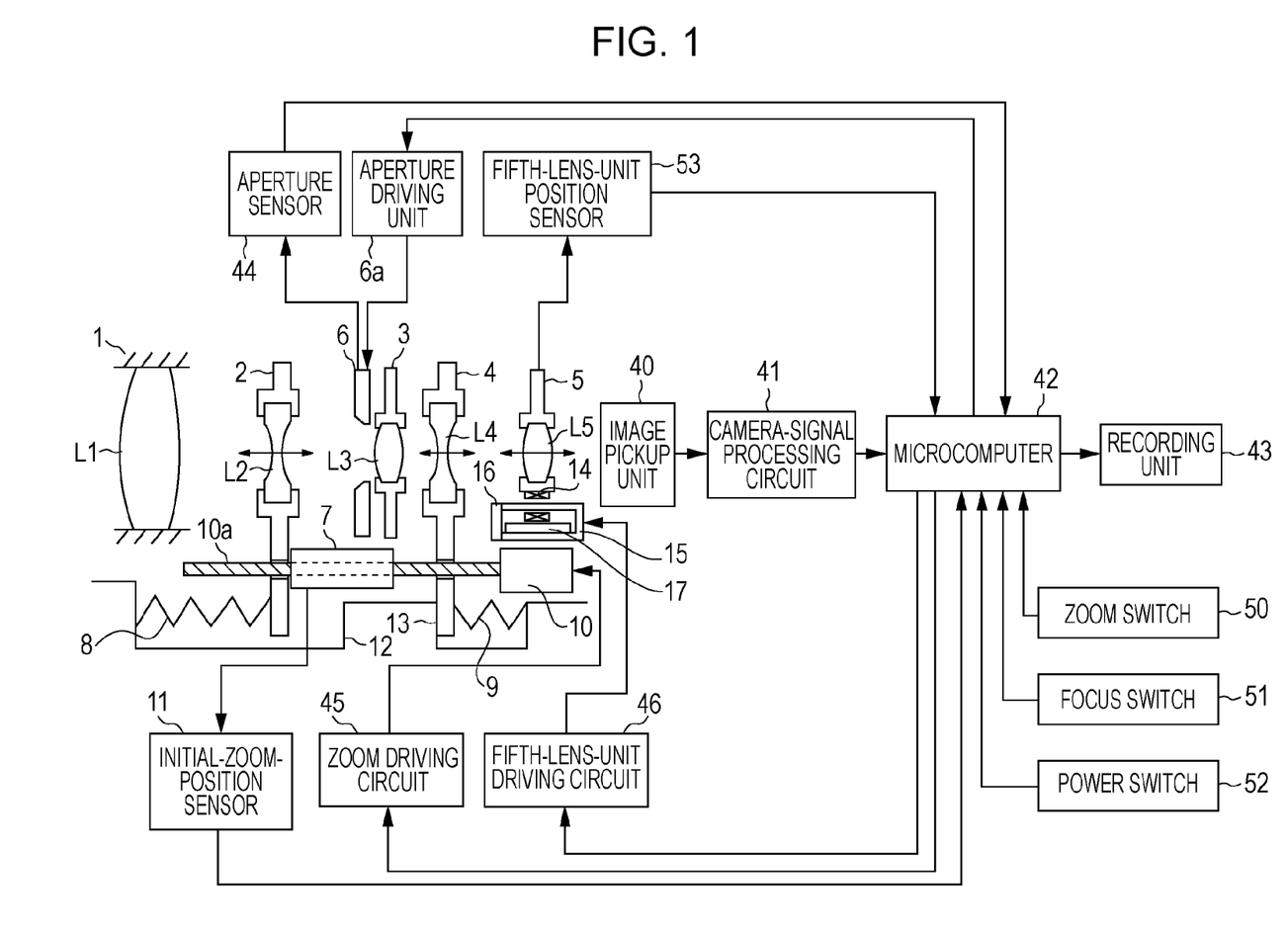
FIG. 1 shows a configuration of an optical apparatus according to a first embodiment of the present invention.

FIG. 1 shows a configuration of an optical apparatus according to a first embodiment of the present invention, which apparatus is used in a digital still camera, a video camera, or an interchangeable lens.

In the first embodiment, an imaging optical system includes, in order from an object side to an image side, a first lens unit, a second lens unit, a third lens unit, a fourth lens unit, and a fifth lens unit.

Referring to FIG. 1, a first lens unit L1 has a positive refractive power, and does not move during zooming.

A second lens unit L2 has a negative refractive power, and serves as a first zoom lens unit that moves along the optical axis for zooming.

A third lens unit L3 has a positive refractive power, and does not move during zooming.

A fourth lens unit L4 has a negative refractive power, and serves as a second zoom lens unit that moves along the optical axis for zooming.

A fifth lens unit L5 has a positive refractive power, and moves along the optical axis for focusing.

A front barrel 1 holds the first lens unit L1. A first moving member 2 holds the second lens unit L2 serving as the first zoom lens unit. A fixed barrel 3 holds the third lens unit L3.

A second moving member 4 holds the fourth lens unit L4 serving as the second zoom lens unit. A third moving member 5 holds the fifth lens unit L5.

An image pickup unit 40 includes a CCD or a CMOS, a low-pass filter, and an infrared cut filter, and is fixed to a rear barrel (not shown).

A camera-signal processing circuit 41 subjects the output from the image pickup unit 40 to predetermined amplification and gamma correction.

A microcomputer 42 receives and processes multiple signals, and outputs multiple signals in accordance with input signals so as to control the optical apparatus.

A recording unit 43 records image signals processed by the microcomputer 42, recording conditions, etc.

A zoom switch 50 orders zooming.

A focus switch 51 orders focusing.

Reference numeral 52 denotes a power switch.

The first moving member 2 is supported by two guide bars (not shown) in a manner such as to be movable along the optical axis.

The second moving member 4 is supported by two guide bars (not shown) in a manner such as to be movable along the optical axis.

An aperture stop 6 changes the aperture diameter of the optical system. The aperture stop 6 is of a guillotine type that changes the aperture diameter by moving two aperture blades in opposite directions using an aperture driving portion 6a.

An aperture sensor 44 detects the rotating position of a driving magnet in the aperture stop 6 with a Hall element.

An image signal is output from the image pickup unit 40 to the camera-signal processing circuit 41.

In the camera-processing circuit 41, the image signal is subjected to predetermined amplification and gamma correction, and is then output to the microcomputer 42.

On the basis of the input signal from the camera-signal processing circuit 41 and an input signal from the aperture sensor 44 relating to the rotation amount of the aperture driving portion 6a, the microcomputer 42 outputs an aperture driving signal to the aperture driving portion 6a so as to adjust the light quantity.

A zoom motor 10 is formed by an actuator serving as a driving unit for moving the second lens unit L2 and the fourth lens unit L4 along the optical axis for zooming.

A lead screw 10a serving as a feed screw is engaged with a rack member 7 that is held and guided by a rotation regulating member (not shown) such as to be movable along the optical axis. The rack member 7 is moved along the optical axis by rotation of a rotor provided in the zoom motor 10.

The lead screw 10a is provided to be coaxial with the rotor and parallel to the optical axis.

The first moving member 2 is urged toward a first regulating portion 12, which regulates movement along the optical axis, by a coil spring 8 serving as a first urging member.

The second moving member 4 is urged toward a second regulating portion 13, which regulates movement along the optical axis, by a coil spring 9 serving as a second urging member.

A photointerrupter 11 serving as an initial-zoom-position sensor electrically detects switching between light shielding and light transmission caused by the movement of a light shielding portion (not shown) in the rack member 7 along the optical axis, and detects a reference position of the rack member 7 along the optical axis.

Figure 7:
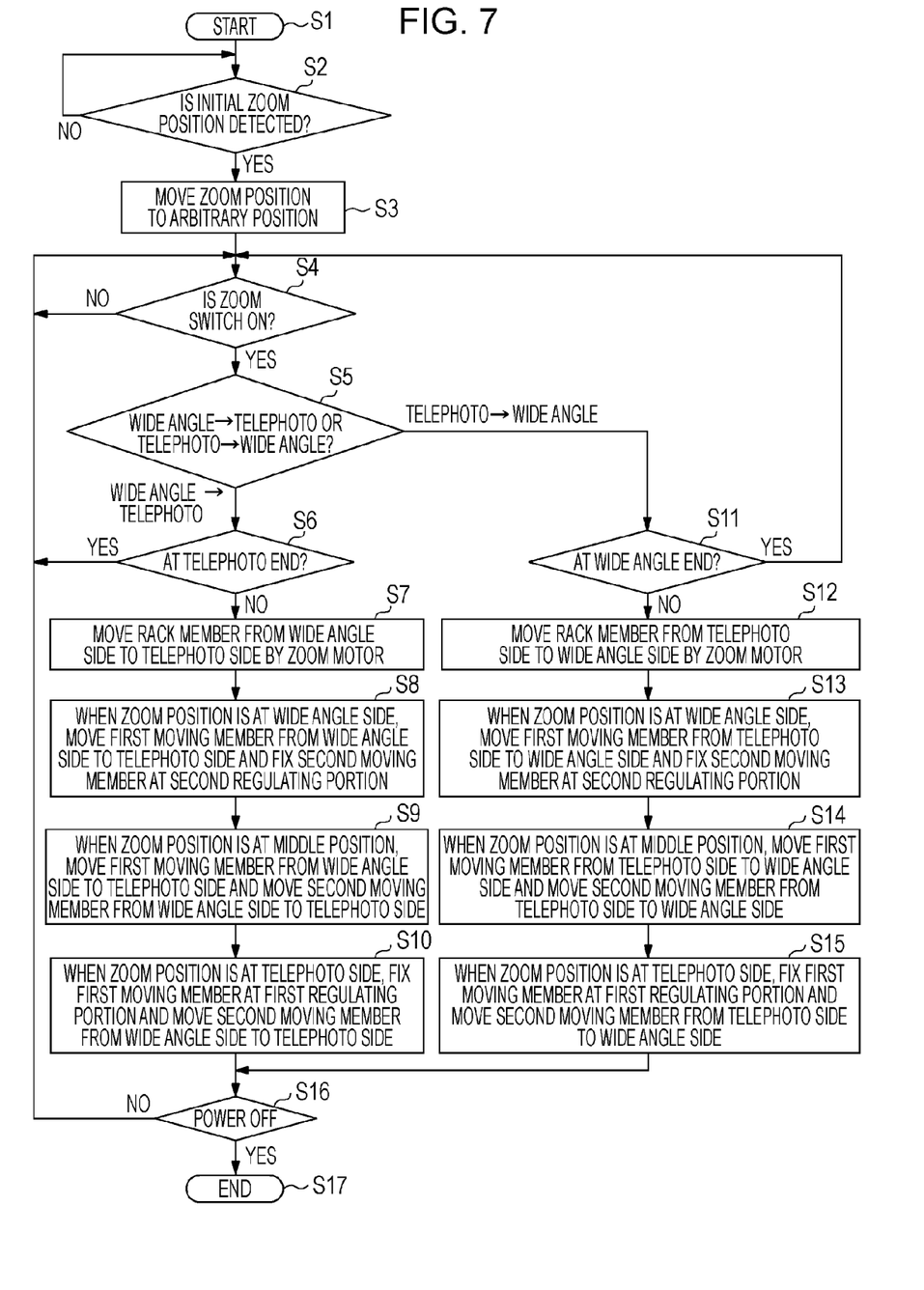
FIG. 7 is a flowchart explaining zooming in the first embodiment.

Zooming will be described below with reference to FIG. 7 serving as a flowchart.

In Step S1, when the power switch 52 is turned on, the zoom motor 10 receives a driving signal from a zoom driving circuit 45 in response to a signal from the microcomputer 42.

An initial position is detected by the photointerrupter 11 in Step S2, and the first moving member 2 moves to a predetermined position and stands by thereat in Step S3. The zoom motor 10 is driven in accordance with the number of steps from the initial position corresponding to the operation of the zoom switch 50 so as to perform position control.

When the zoom switch 50 is operated in Step S4, it is determined in Step S5 which moving direction is selected, and zooming is then performed.

Figure 2:
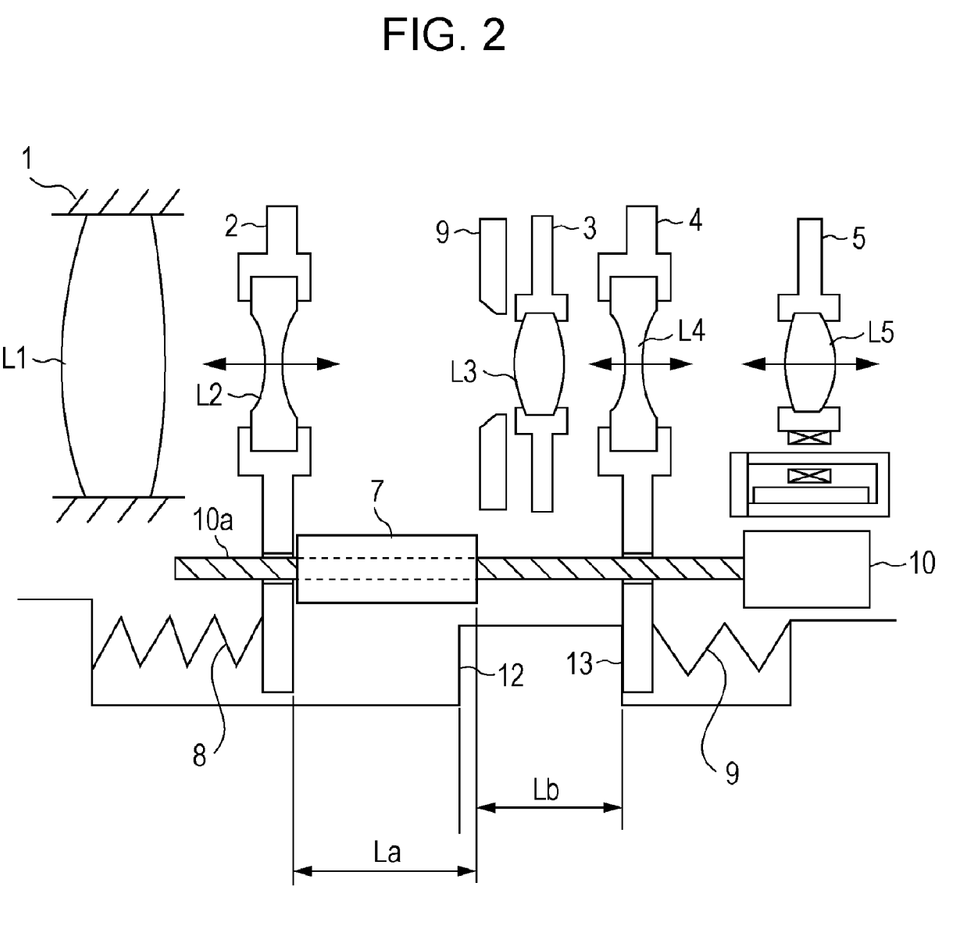
FIG. 2 shows a wide-angle zoom range in the first embodiment.
Figure 3:
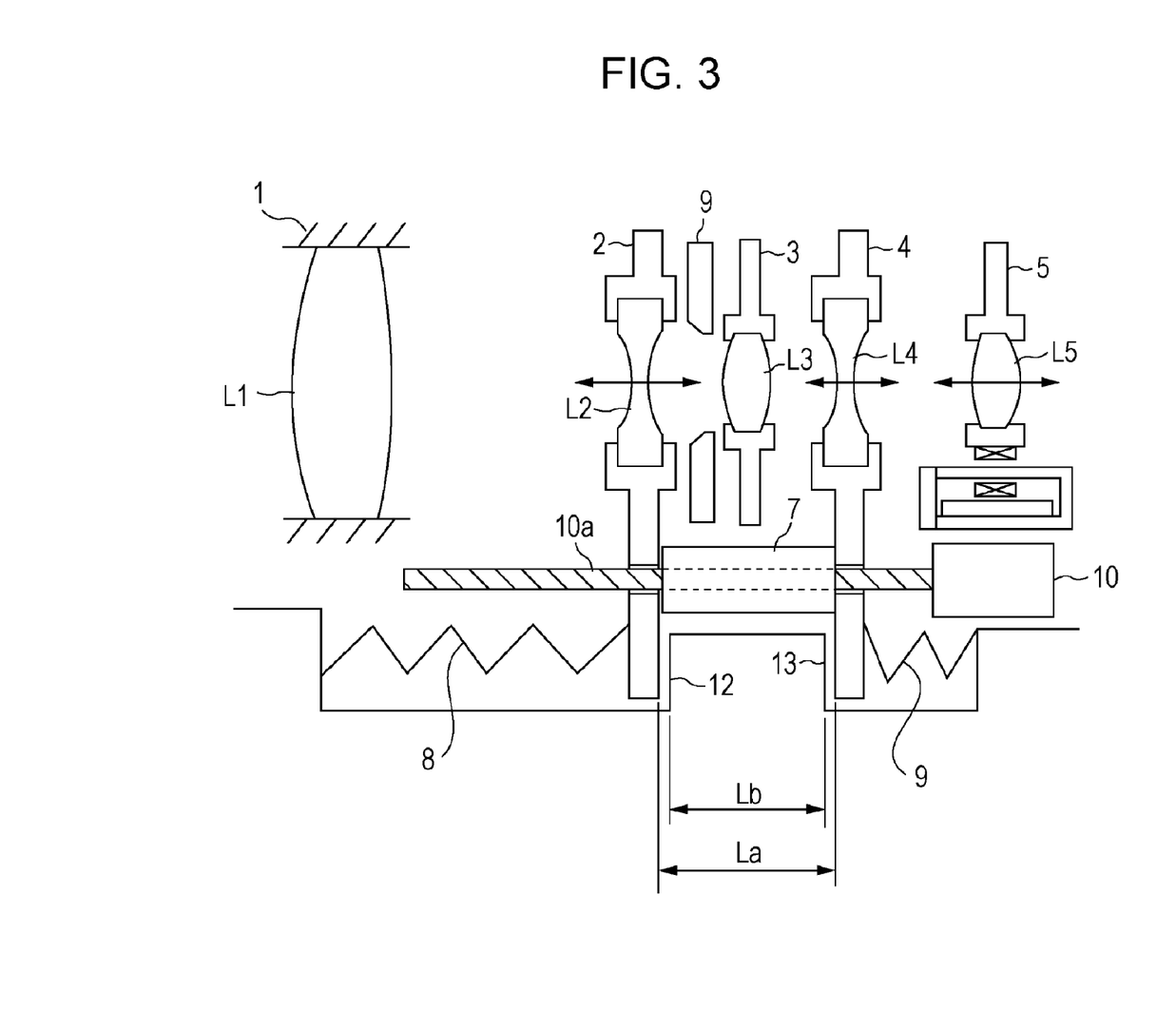
FIG. 3 shows a middle position (where switching between a second lens unit and a fourth lens unit is made) in the first embodiment.
Figure 4:
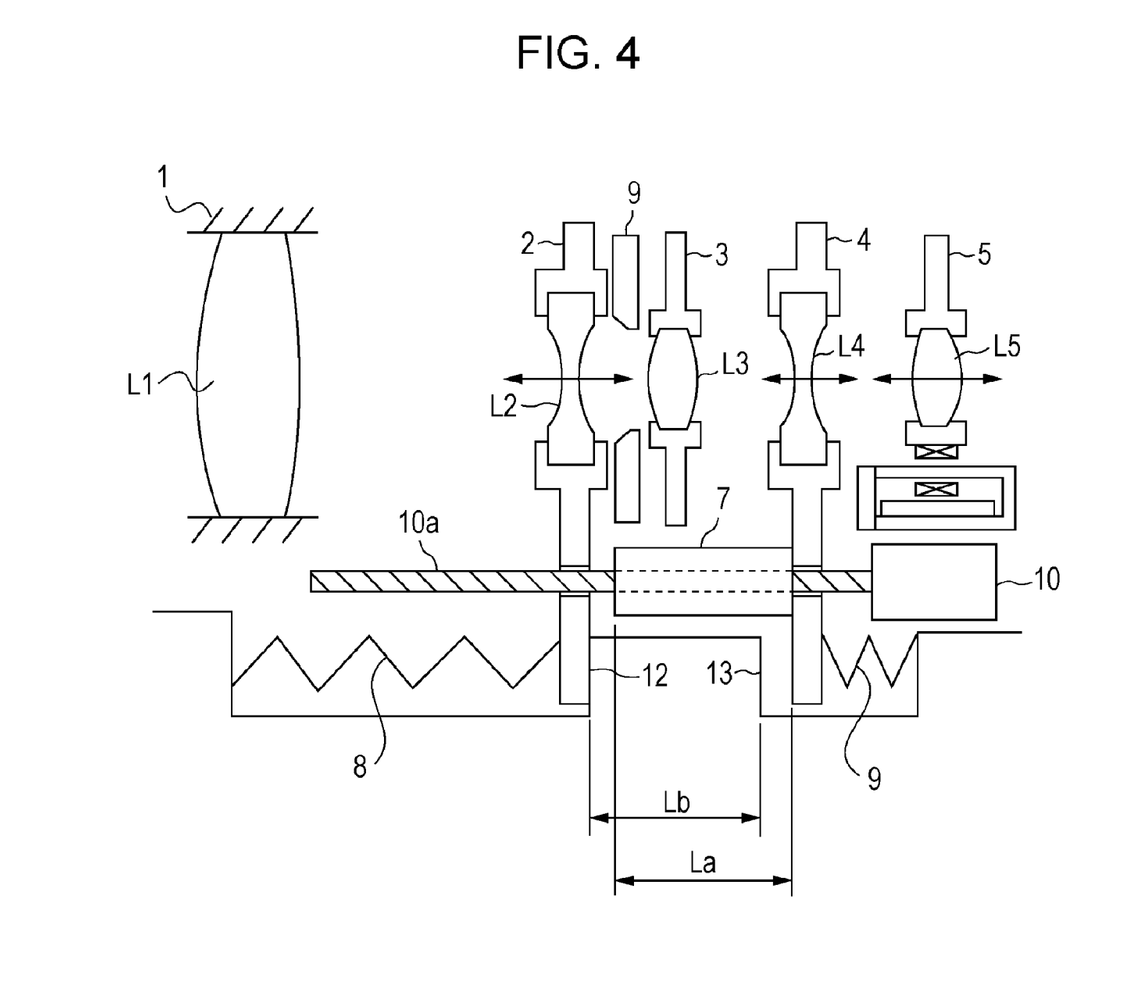
FIG. 4 shows a telephoto zoom range in the first embodiment.

Zooming will be described with reference to FIG. 2 showing a wide angle side, FIG. 3 showing a middle position (where switching between the second lens unit L2 and the fourth lens unit L4 is made), and FIG. 4 showing a telephoto side.

On the wide angle side, as shown in FIG. 2, the first moving member 2 is urged toward the rack member 7 by the coil spring 8 serving as the first urging member, and moves along the optical axis in conjunction with the movement of the rack member 7 serving as the interlocking movement member.

The second moving member 4 is urged toward the second regulating portion 13 by the coil spring 9 serving as the second urging member, and is fixed at the position (Step S8 or S13).

When the rack member 7 moves from the wide angle zoom range toward the telephoto zoom range, the zoom position is shifted to the middle position (where switching between the second lens unit L2 and the fourth lens unit L4 is made).

As shown in FIG. 3, a length La of the rack member 7 along the optical axis (distance between a portion of the rack member 7 in contact with the first moving member 2 and a portion of the rack member 7 in contact with the second moving member 4) is set to be larger than or equal to a distance Lb between the first regulating portion 12 and the second regulating portion 13.

In other words, the first moving member 2 and the second moving member 4 are both in contact with the rack member 7 at an arbitrary position along the optical axis so as to realize continuous zooming.

The distance Lb between the first regulating portion 12 and the second regulating portion 13 is shorter than the length La of the rack member 7 along the optical axis.

At the middle position, the first moving member 2 is urged toward the rack member 7 by the coil spring 8, and the second moving member 4 is urged toward the rack member 7 by the coil spring 9. The first moving member 2 and the second moving member 4 move along the optical axis in conjunction with the movement of the rack member 7 (Step S9 or S14).

On the telephoto side, as shown in FIG. 4, the second moving member 4 is urged toward the rack member 7 by the coil spring 9 serving as the second urging member, and moves along the optical axis in conjunction with the movement of the rack member 7.

The first moving member 2 is urged toward the first regulating portion 12 by the coil spring 8 serving as the first urging member, and is fixed at that position (Step S10 or S15).

As described above, continuous zooming is performed by the second lens unit L2 and the fourth lens unit L4 in conjunction with the movement of the rack member 7 along the optical axis.

In the first embodiment, the first regulating portion 12 and the second regulating portion 13 are formed by an integral projecting portion.

An air core coil 14 substantially shaped like a rectangular cylinder and a flexible printed board (not shown) for supplying power to the coil 14 are fixed to the third moving member 5.

Yokes 15 and 16 and a magnet 17 are fixed to a rear barrel (not shown).

The yoke 15 is angular U-shaped, and extends along the optical axis. The magnet 17 is held in the yoke 15.

The yoke 15 extends through the air core portion of the coil 14. The coil 14, the yoke 15, and the magnet 17 are spaced a predetermined distance apart.

The magnet 17 is magnetized in a direction orthogonal to the optical axis, and extends along the optical axis.

The yoke 16 is held at an open end of the angular U-shaped yoke 15. The coil 14, the yokes 15 and 16, and the magnet 17 constitute a linear actuator serving as a voice coil motor.

When power is supplied from the flexible printed board (not shown) to the coil 14 by a fifth-lens-unit driving circuit 46, the third moving member 5 is driven along the optical axis by the action of a magnetic circuit defined by the yokes 15 and 16 and the magnet 17 fixed to the rear barrel.

An optical scale (not shown) in which irregularities are provided at a predetermined pitch along the optical axis is bonded and fixed to the third moving member 5.

An optical sensor (not shown) held by the rear barrel faces the optical scale.

The optical sensor includes a light emitting portion and a sensor for measuring the amount of light reflected by the optical scale.

The optical scale and the optical sensor are spaced a predetermined distance, which is necessary to detect the amount of reflected light from the optical scale, apart from each other, and constitute a position sensor 53 for the fifth lens unit L5.

The initial position of the third moving member 5 is determined in a state in which the third moving member 5 is in contact with an image plane side (CCD side) of the rear barrel.

Subsequent position detection and driving control of the third moving member 5 are performed by the microcomputer 42 on the basis of a signal output from the optical sensor when the optical scale positioned and held by the third moving member 5 moves relative to the optical sensor.

The microcomputer 42 outputs a driving signal to the fifth-lens-unit driving circuit 46 in accordance with the signal input from the fifth-lens-unit position sensor 53, and a signal from the focus switch 51 or an autofocus signal.

The fifth-lens-unit driving circuit 46 supplies power to the coil 12 according to the signal input from the microcomputer 42 so as to drive the fifth lens unit L5 along the optical axis.

Figure 5:
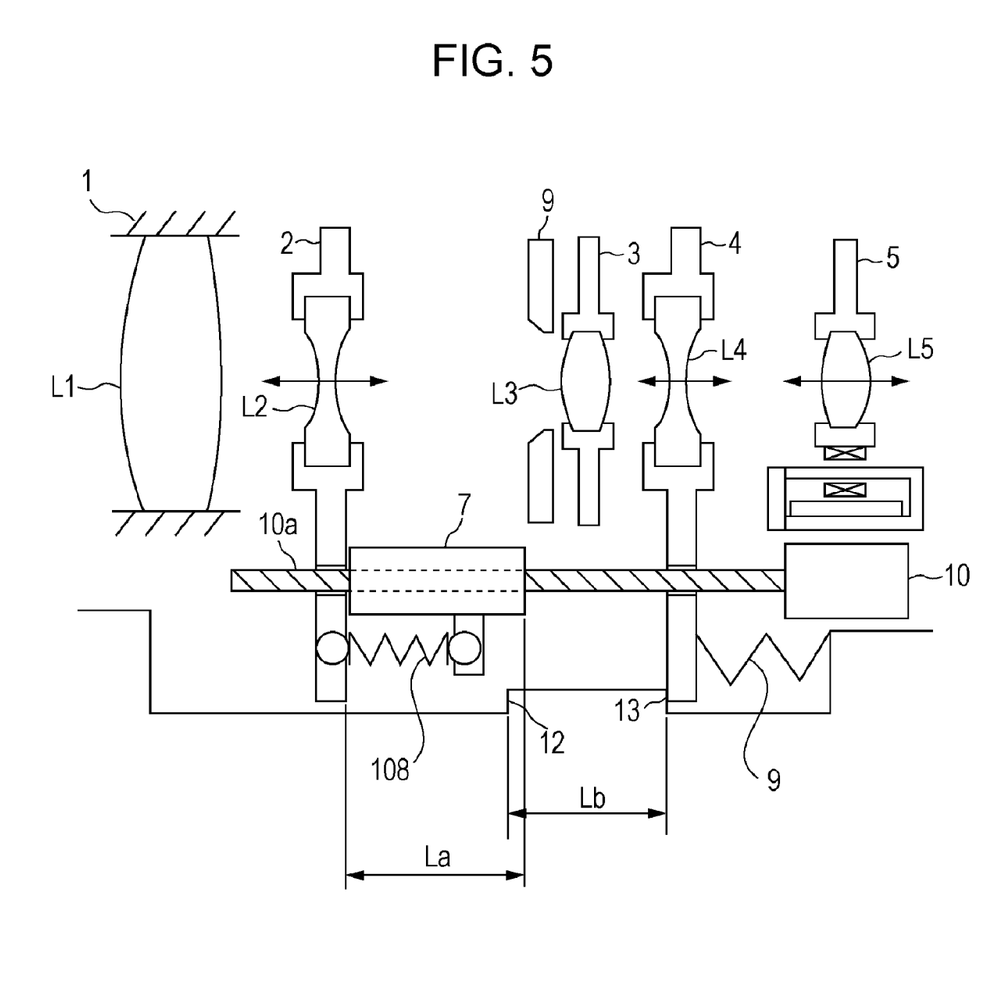
FIG. 5 shows a modification of the first embodiment in which a spring urging direction is changed.

While the spring for urging the moving member toward the rack member 7 is formed by a compression spring in the first embodiment, similar advantages can be obtained when the spring is formed by a tension spring 108, as shown in FIG. 5.

Second Embodiment

Figure 6:
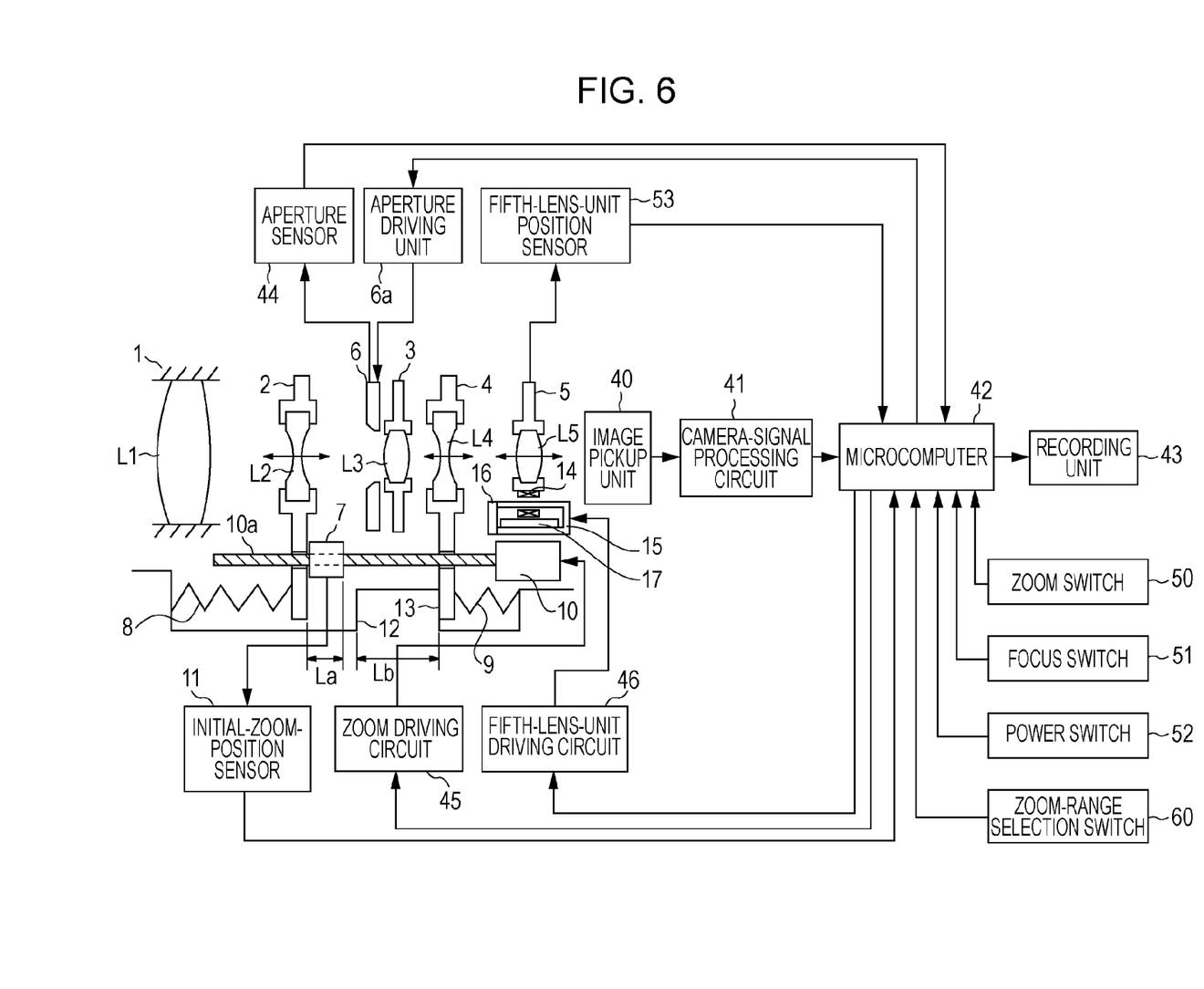
FIG. 6 shows a middle position (where switching between a second lens unit and a fourth lens unit is made) in a second embodiment of the present invention.

In an optical apparatus according to a second embodiment, the dimensions at a middle position (where switching between a second lens unit L2 and a fourth lens unit L4 is made) are changed, as shown in FIG. 6.

Other structures of the optical apparatus are the same as those adopted in the first embodiment.

In the second embodiment, a lead screw 10a serving as a feed screw is also provided to be coaxial with a rotor in a zoom motor and parallel to the optical axis.

In other words, a length La of a rack member 7 along the optical axis (distance between a portion of the rack member 7 in contact with a first moving member 2 and a portion in contact with a second moving member 4) is set to be smaller than a distance Lb from a first regulating portion 12 to a second regulating portion 13. This can make two discontinuous zoom ranges.

To achieve discontinuous zooming, both the first moving member 2 and the second moving member 4 are not in contact with the rack member 7 at an arbitrary position along the optical axis.

The distance Lb between the first regulating portion 12 and the second regulating portion 13 along the optical axis is longer than the length La of the rack member 7 along the optical axis.

Figures 8, 8A:
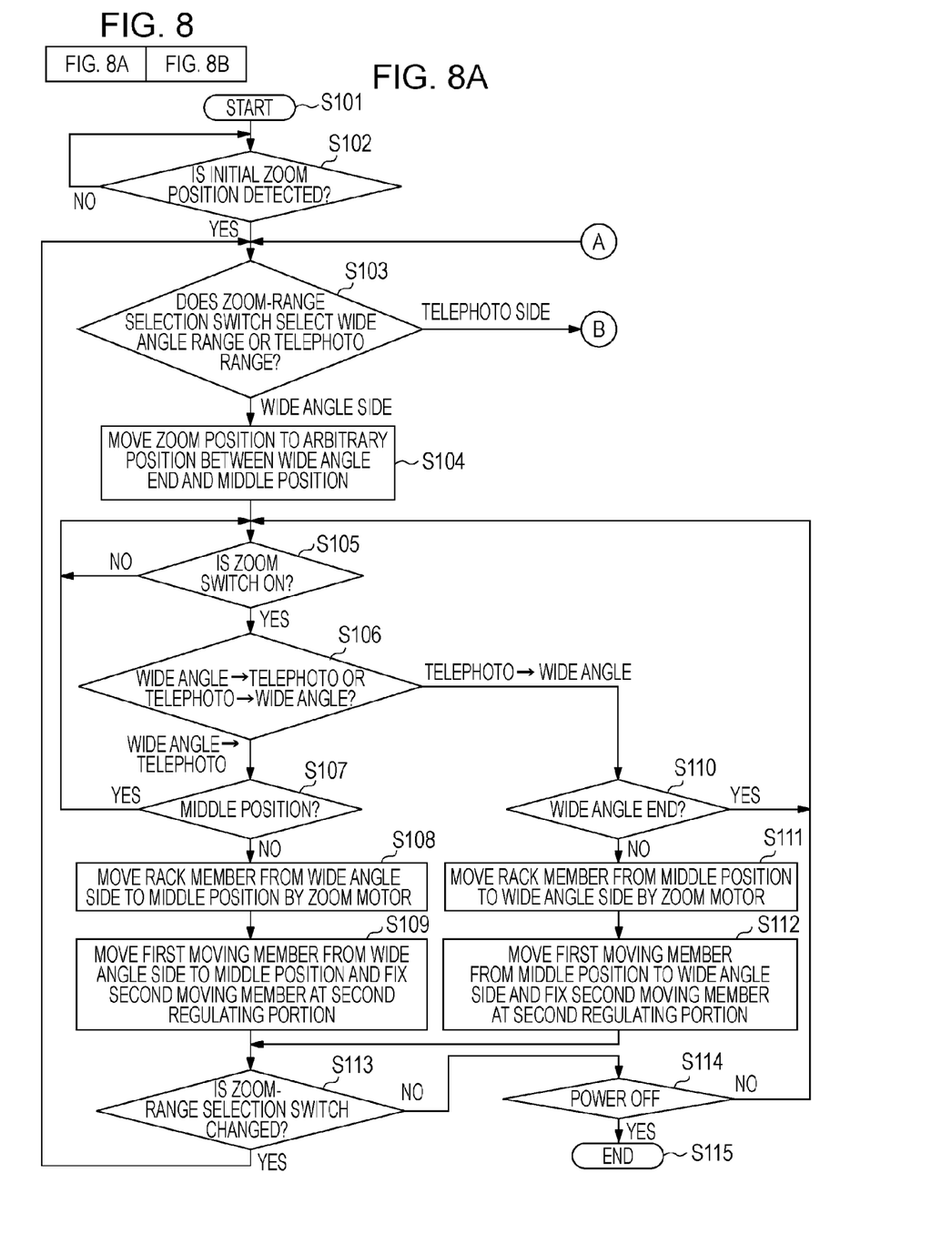
Figure 8B:
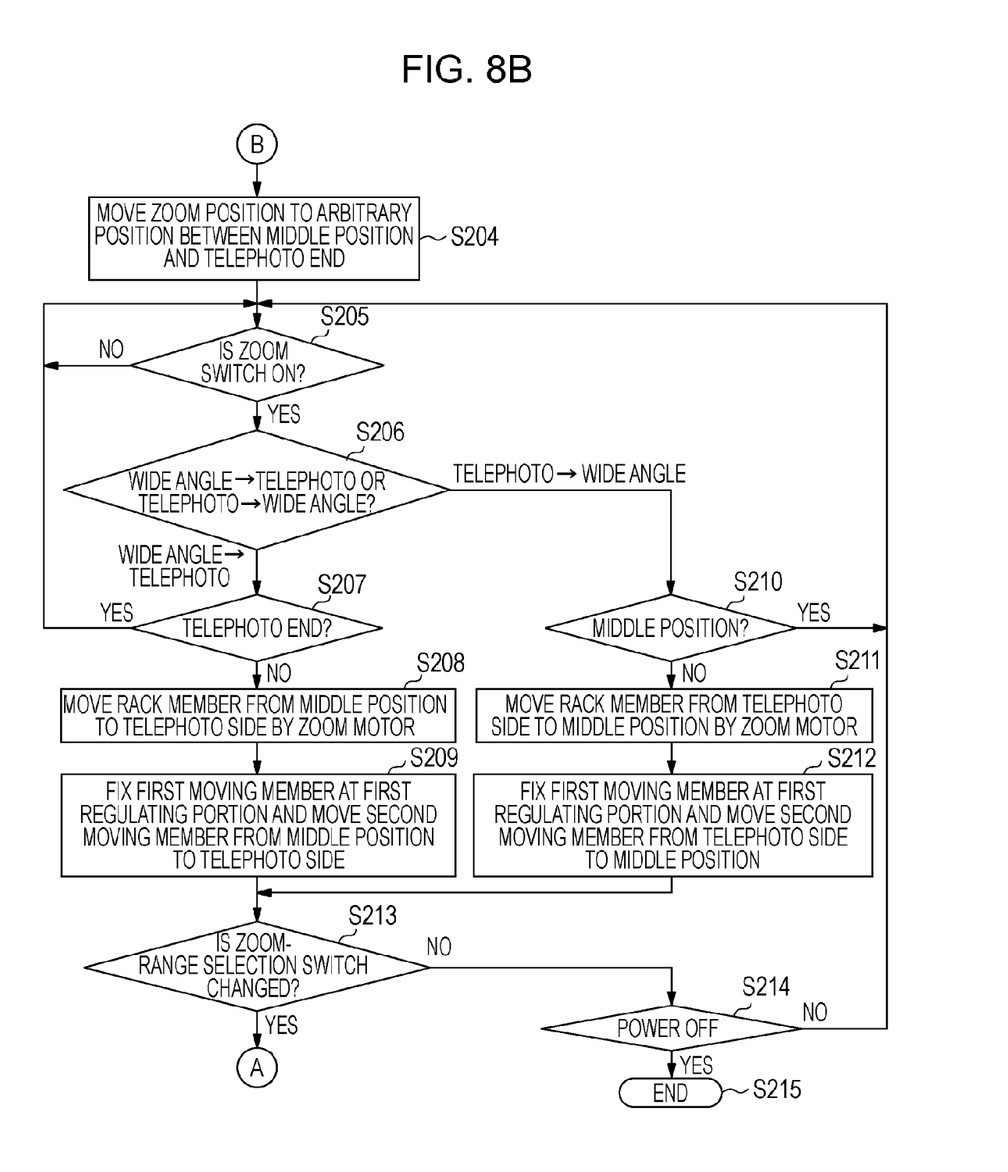

Zooming will be described with reference to FIG. 8 serving as a flowchart.

When a power switch 52 is turned on in Step S101, a zoom motor 10 receives a driving signal from a zoom driving circuit 45 in response to a signal from a microcomputer 42.

In Step S102, an initial position is detected by a photointerrupter 11.

A photographer can select a wide-angle zoom range or a telephoto zoom range through a zoom-range selection switch 60 in Step S103.

For example, in a zoom lens capable of zooming with an ultrahigh zoom ratio of 50 or more, the position can be shifted at a high speed from a standby position, where the power switch 52 is operated, to an arbitrary zoom position.

When the wide-angle zoom range is selected by the zoom-range selection switch 60 in Step S103, the first moving member 2 is moved to a predetermined position between the wide angle end and the middle position in Step S104, and stands by at that position.

The zoom motor 10 is driven in accordance with the number of steps from the initial position corresponding to the operation of the zoom switch 50 so as to perform position control.

In Steps S105 to S115, position control in accordance with the number of steps from the position, where the initial position is detected by the photointerrupter 11, corresponding to the operation of the zoom switch 50 is performed between the wide angle end and the middle position.

In this case, in Step S109 or S112, zooming is performed in a state in which the first moving member 2 moves along the optical axis and the second moving member 4 is fixed at the second regulating portion 13.

When the telephoto zoom range is selected by the zoom-range selection switch 60 in Step S103, the first moving member 2 moves to a predetermined position between the middle position and the telephoto end in Step S204, and stands by at that position.

The zoom motor 10 is driven in accordance with the number of steps from the initial position corresponding to the operation of the zoom switch 50 so as to perform position control.

In Steps S205 to S215, position control in accordance with the number of steps from the position, where the initial position is detected by the photointerrupter 11, corresponding to the operation of the zoom switch 50 is performed between the middle position and the telephoto end.

In this case, in Step S209 or 212, zooming is performed in a state in which the first moving member 2 is fixed at the first regulating portion 12 and the second moving unit 4 moves along the optical axis.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-204514 filed Aug. 7, 2008, which is hereby incorporated by reference herein in its entirety.

What is claimed is:

1. An optical apparatus comprising:
   a first moving member configured to hold a first zoom lens unit;
   a second moving member configured to hold a second zoom lens unit;
   a feed screw provided parallel to the optical axis of the first zoom lens unit and the second zoom lens unit;
   an actuator configured to drive the feed screw;
   an interlocking movement member configured to move along the optical axes with rotation of the feed screw;
   a first urging member configured to urge the first moving member toward the interlocking movement member;
   a second urging member configured to urge the second moving member toward the interlocking movement member;
   a first regulating portion configured to regulate movement of the first moving member along the optical axis; and
   a second regulating portion configured to regulate movement of the second moving member along the optical axis,
   wherein the first moving member and the second moving member are moved along the optical axis by movement of the interlocking movement member along the optical axis.

2. The optical apparatus according to claim 1, wherein a distance along the optical axis between the first regulating portion and the second regulating portion is smaller than a length of the interlocking movement member along the optical axis so that continuous zooming is performed by simultaneous contact of the first moving member and the second moving member with the interlocking movement member at an arbitrary position along the optical axis.

3. The optical apparatus according to claim 1, wherein a distance along the optical axis between the first regulating portion and the second regulating portion is larger than a length of the interlocking movement member along the optical axis so that discontinuous zooming is performed by preventing simultaneous contact of the first moving member and the second moving member with the interlocking movement member at an arbitrary position along the optical axis.

4. An optical apparatus comprising:
   a first lens unit having a positive refractive power;
   a second lens unit having a negative refractive power and configured to move along the optical axis during zooming;
   a third lens unit having a positive refractive power;
   a fourth lens unit having a negative refractive power and configured to move along the optical axis during zooming;
   a fifth lens unit having a positive refractive power and configured to move along the optical axis during focusing;
   a first moving member configured to hold the second lens unit;
   a second moving member configured to hold the fourth lens unit;
   a feed screw provided parallel to the optical axis of the second lens unit and the fourth lens unit;
   an actuator configured to drive the feed screw;
   an interlocking movement member configured to move along the optical axis with rotation of the feed screw;
   a first urging member configured to urge the first moving member toward the interlocking movement member;
   a second urging member configured to urge the second moving member toward the interlocking movement member;
   a first regulating portion configured to regulate movement of the first moving member along the optical axis; and
   a second regulating portion configured to regulate movement of the second moving member along the optical axis,
   wherein the first to fifth zoom lens units are arranged in order from an object side to an image side, and
   wherein the first moving member and the second moving member are moved along the optical axis by movement of the interlocking movement member along the optical axis.

* * * * *